July 3, 1956

W. ZAUNER 2,752,685

DRAWING TRIANGLE

Filed Oct. 31, 1951

Inventor

WALTER ZAUNER by W. Jurim Haskett.

Attorney.

United States Patent Office 2,752,685
Patented July 3, 1956

2,752,685

DRAWING TRIANGLE

Walter Zauner, Salzburg, Austria, assignor of forty per cent to Emery Szasz, Outremont, Montreal, Quebec, Canada, and sixty per cent to Josef Etler, New York, N. Y.

Application October 31, 1951, Serial No. 253,997

4 Claims. (Cl. 33—109)

This invention relates to improvements in a drawing triangle having for its primary object to furnish a simple and handy drawing instrument with which the draughtsman will be in a position to meet easily and quickly all the problems of drawing straight lines.

For the purpose of determining the required performance of such a universal drawing instrument, it is necessary to break down the entire field of drawing with straight lines into its basic tasks viz:

(1) Drawing straight lines through two given points;
(2) Drawing straight lines through a given point at any angle to another straight line (a frequent occurrence in normal drawing);
(3) Drawing parallel lines through two or more given points;
(4) Measuring lengths and drawing same; and
(5) Measuring angles and drawing same.

With these five basic tasks any drawing with straight lines can be performed, whereby the separate basic task are of equal importance.

To make any desired drawing by using only a single drawing instrument, the demand arises for a simple and handy drawing instrument which is capable of solving all the afore-mentioned necessary basic tasks.

While this demand is being met by known drawing machines, these are heavy, expensive and, even if not permanently fastened to a board, cumbersome to use and transport.

All other known drawing instruments accomplish only some of the above-mentioned necessary tasks, consequently, by using only one of these instruments, it is not possible to make all the straight lines in a drawing that may be required and the acquisition of several additional drawing tools becomes necessary. This is true in particular of any known drawing instrument having parallel edge guiding means.

To overcome these deficiencies, it is an object of this invention to provide a drawing triangle having shafts running parallel with each of the several drawing edges of the triangle, with rollers fixed on same, which additionally, for the purpose of drawing lines at an angle, is supplied with an angle measuring device placed above the centre of the hypotenuse drawing edge or over a point on the normal line erected on the hypotenuse drawing edge.

A further object of the invention is to provide a drawing triangle having on its surface optically discernible pressure spots easily located and readily engaged by the user's finger for tilting the triangle plate by pressure of a finger, in order to attain an even and normal pressure on the pressure spot and on the corresponding rollers, transferring an even friction of the rollers to the triangle-supporting surface, and thereby achieving the greatest possible accuracy of the parallel movement.

By the arrangement of the angle measuring device as part of, or as attachment to one drawing triangle movable in three directions by means of rollers, all the mentioned basic tasks of drawing with straight lines, and using only a single drawing tool, can be accomplished now with only one hand and no other drawing tool is required in the making of such drawings.

Owing to this circumstance the speed of drawing is substantially increased and the number of drawing instruments, which clutter up a draughting table and tend to affect the draughtsman adversely, is reduced to the minimum, namely, to a single one.

Through the present combination and arrangement, according to this invention, of the drawing edges, the angle division and the shaft with rollers, the price of this drawing triangle is hardly any higher than that of an ordinary triangle, despite the fact that it performs all the functions of two triangles, a T-square and a protractor combined.

Referring particularly to the drawings—

Figure 1:
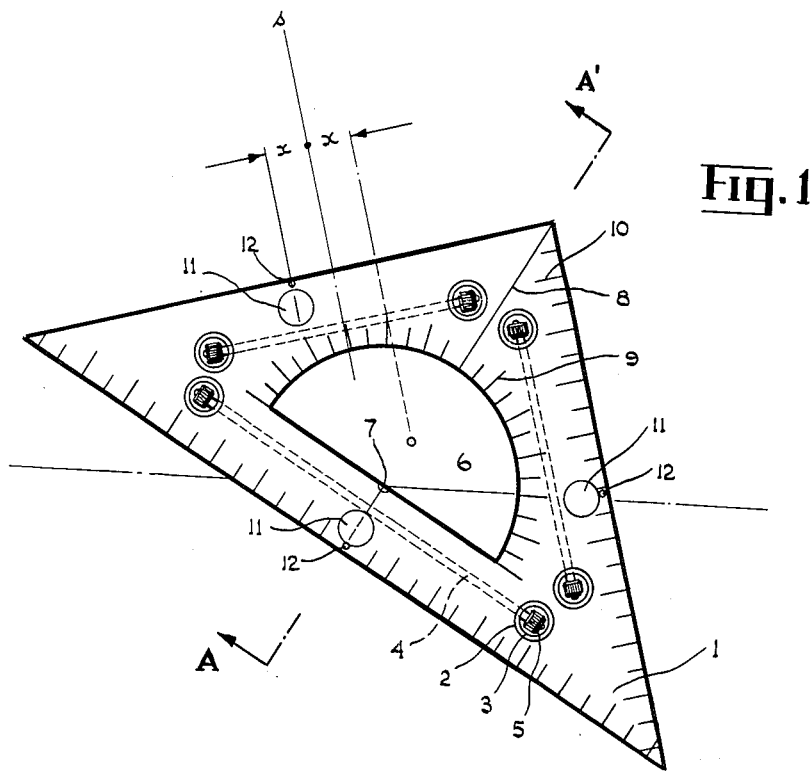
Figure 1 is a plan view of the improved drawing triangle.

Figure 1 shows the triangular drawing plate 1 with six borings 2 arranged in spaced pairs, the two bores of a pair being located equidistant from one drawing edge. Metal rings 3 are pressed into these openings 2 and serve as bearings and as end limits for the three revolving shafts 4 and, on the other hand, house rollers 5 secured on each end of said shafts which run parallel to the respective drawing edges of said drawing triangle.

The triangle plate 1 has a semi-circular opening 6; the centre 7 of this cut-out semi-circle being situated on the normal line 8 engraved through the centre of the drawing edge of the hypotenuse.

Above this point 7 is the protractor scale 9 graduated from 0° to 180°. The drawing edges of the drawing plate have linear divisions 10 also marked thereon.

Pressure spots 11 for the fingers, one for each roller shaft, are shown in Figure 1 as trough-shaped cavities embedded in the triangle plate. The center of the pressure spot is located between the roller shaft and the corresponding parallel drawing edge. The distance $x$ between a line normal to the axis of the roller shaft passing through the center of gravity of the drawing triangle and a symmetrical line $s$ normal to the axis of the roller shaft bisecting the axis is equal to the distance $x$ between the center of the pressure spot and symmetrical lines.

Between the trough-shaped cavities 11 and the drawing edge, or at other desired points, the triangle plate has perforations 12 through which the lead end of a drawing pencil can be inserted for guidance, and by means of which lines at angles less than 90° or 45° can be drawn quickly when the triangle is moved on parallel lines, the triangle being adjusted to the proper angle by use of the protractor 9, as shown in Figure 1, and shifted when desired from the location of one parallel line to the next along a T-square or other straight edge in the usual way.

Figure 2:
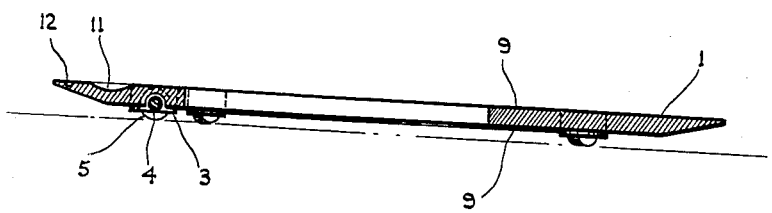
Figure 2 is a section therethrough, as taken on section line A—A, looking in the direction indicated by the arrows.

It will be readily seen from Figure 2 that the roller shafts 4 journalled in the rings 3 lie above one side of the triangle plate only, while the other side is perfectly flat and also that the pressure point cavities 11 occur only in one side of the plate, namely the perfectly flat side opposite that from which the shaft carried rollers 5 project.

This arrangement allows of the use of this flat or even surface of the triangle directly on the drawing underneath, which sometimes is convenient, for instance, when exact measurements of distances or parts of angles are required, or when using it as an ordinary triangle. It is therefore advantageous to have the linear and angle measurements on both sides of the triangle or to manufacture the drawing triangle from transparent or semi-diaphanous material so that markings on one side may be seen from the other. A typical use of the triangle is shown in Figure 1 where by use of the protractor scale 9 the instrument has been arranged at an angle of 60° with respect to the underlying horizontal line. By inserting a pencil point through the perforation 12 (next the hypotenuse) and pressing the finger on the adjacent cavity 11, the triangle is tilted on the near shaft and rollers 4—5 and will run truly at the desired angle. The pencil is held in the one hand used both to tilt and move the triangle.

From the foregoing description taken in connection with the accompanying drawings, it will be manifest that a drawing triangle is provided that will fulfill all the necessary requirements of such a device, but as many changes could be made in the above description and many apparently widely different embodiments of the invention may be constructed within the scope of the appended claims, without departing from the spirit or scope thereof, it is intended that all matters contained in the said accompanying specification and drawings shall be interpreted as illustrative and not in a limitative or restrictive sense.

Having thus described my invention, what I claim as new is:

1. A drawing triangle with shafts arranged in a triangle running one parallel with each of the drawing edges, said shafts being located nearer one lateral face of the triangle, a spaced pair of fixed rollers on each shaft projecting from only one face of said triangle; and a protractor scale in the form of a semi circular cutout graduated from 0°–180° and lying within the triangular arrangement of said shafts said scale having its center disposed above the center of the drawing edge of the hypotenuse at a point along the normal line erected through the center of the drawing edge of the hypotenuse.

2. A drawing triangle, as set forth in claim 1, including distinctly marked pressure points on the surface of the triangle disposed between each roller shaft and the corresponding drawing edge running parallel to it, the center of each pressure point being located at the same distance from a symmetrical line normal to and bisecting the axis of one roller shaft as the distance between said symmetrical line and a line normal to the axis of said one roller shaft passing through the center of gravity of the drawing triangle.

3. A drawing triangle, as set forth in claim 2, wherein said distinctly marked pressure points are cavities embedded in the surface of the triangle for engagement by a finger of the user to tilt the triangle on the adjacent shaft.

4. A drawing triangle, according to claim 2, having perforations through the triangle between the respective pressure points and their corresponding drawing edges, for the purpose of inserting the sharp lead end of a pencil.

References Cited in the file of this patent

UNITED STATES PATENTS

| | | |
|---|---|---|
| D. 136,091 | Tripp | Aug. 3, 1943 |
| 462,126 | Griffiths | Oct. 27, 1891 |
| 676,740 | Farini | June 18, 1901 |
| 677,777 | Goldman | July 2, 1901 |
| 885,076 | Olson | Apr. 21, 1908 |
| 1,486,455 | Robinson | Mar. 11, 1924 |
| 1,619,427 | McCaffery | Mar. 1, 1927 |
| 2,479,093 | Bailes | Aug. 16, 1949 |

FOREIGN PATENTS

| | | |
|---|---|---|
| 3,110 | Great Britain | Mar. 20, 1897 |